United States Patent
Kutz

[15] 3,698,688
[45] Oct. 17, 1972

[54] WATER FAUCETS
[72] Inventor: Hugo Joseph Kutz, 504 Western Avenue, Grafton, N. Dak. 58237
[22] Filed: July 16, 1970
[21] Appl. No.: 55,310

[52] U.S. Cl. .............251/335, 137/454.5, 137/454.6
[51] Int. Cl. ...........................................F16k 41/04
[58] Field of Search ...................251/335; 137/454.5

[56] References Cited

UNITED STATES PATENTS

| | | | |
|---|---|---|---|
| 2,665,105 | 1/1954 | Svabek, Jr. | 251/335.1 X |
| 2,638,306 | 5/1953 | Fortune | 251/335.1 |
| 2,638,307 | 5/1953 | Fortune | 251/335.1 |
| 2,654,559 | 10/1953 | Franck | 251/335.1 X |
| 2,699,801 | 1/1955 | Schleyer | 251/335.1 X |
| 2,702,686 | 2/1955 | Fortune | 251/335.1 |
| 2,784,934 | 3/1957 | Paulius, Jr. et al. | 251/335.1 X |
| 3,250,288 | 5/1966 | Hammon | 137/454.5 X |
| 3,389,717 | 6/1968 | Povalski et al. | 137/454.5 X |

*Primary Examiner*—Samuel Scott
*Attorney*—Carl T. Mack

[57] ABSTRACT

A water faucet in which the action is definitely of the poppet-valve type. The parts are sealed off from all water so that the arrangement of the parts eliminates the use of stuffing boxes, packing glands, O-rings, presently employed in faucets. Use is made of a specially designed flexible diaphragm having a formed collar at its inner and outer perimeters by means of which it can be securely anchored in position to prevent water from coming in contact with any moving portion of the faucet above said diaphragm.

4 Claims, 3 Drawing Figures

INVENTOR
HUGO J. KUTZ

INVENTOR

HUGO J. KUTZ

BY Carl T. Mack.

ATTORNEYS

WATER FAUCETS

BRIEF SUMMARY OF THE INVENTION

My invention relates to water faucets such as employed on lavatories, kitchen sinks, bathtubs and drinking fountains. The total improvement shows how the upper unit is separated from the base unit when repairs are called for. The upper unit termed a removable section is held together by mated, threaded portions so that the unit is easily lifted out without the necessity of using any special tools. The lower faucet washer does not rotate when the faucet is opened or closed because the operating spindle is not attached to the valve stem. Hence, there is no twisting friction on the washer and seat whenever the faucet is operated. The action therefore is definitely of the poppet-type.

My improvement in the art relating to water faucets is basic because it seals off all water from coming in contact with any portion of the working mechanism of the faucet, and by so doing, it eliminates the use of the troublesome stuffing boxes, packing glands and O-rings heretofore employed in faucets of the prior art. This is accomplished by using a specially designed flexible diaphragm having a formed collar at its inner and outer perimeters by means of which it can be securely locked in place to prevent water from coming in contact with any moving portion of the valve above the diaphragm. By keeping water out of contact with the working mechanism, it is now possible to keep these wearing surfaces permanently lubricated and all forms of stuffing boxes, packing glands, O-rings can be eliminated. Furthermore, should the faucet need service, it can be easily opened and serviced because there will be no corrosion present which, as in conventional faucets, frequently makes it impossible to dismantle parts without destroying others closely associated with those that are corroded. It is difficult to separate the corroded parts.

Reference is to be had to the accompanying drawings forming a part of this specification, in which similar characters of reference indicate corresponding parts in all the views.

FIG 1 shows a faucet embodying my invention which for illustrative purposes is enlarged about four times in comparison to the faucet as manufactured. To give one an idea of the actual size, the valve stem is one-fourth inch diameter; the operating stem is seven-sixteenths inch diameter; the sleeve outside diameter near the top is fifteen-sixteenths inch; and the total valve stem lift is three-eights inch. The valve stem flexes the diaphragm three-sixteenths inch upwardly from the position shown in the drawing to "full open" and it flexes three-sixteenths inch downwardly from its position shown in the drawing to "full close." Conventional faucet lifts range from five-sixteenths to three-eights inch from fully open position to fully closed position.

By adding a section such as shown in FIG. 3, as part of the conventional base with spout and removable seat (in FIG. 1) to the removable cartridge, I have provided an improvement which is most novel.

All of the figures above indicated are shown in enlarged form so as to make it easier to see the parts referred to. In practice, the parts or elements about to be referred to are so small and precisely made that those in the upper portion fit into a detachable cartridge. Reference is made to the showing of a lavatory faucet No. 140, shown in the Gerber repair parts catalog (the precise data not being known). The parts therein shown from NO. 43 down to but excluding part No. 16 are eliminated by the parts forming my invention. Likewise, a Kohler K56 plumbing repair parts catalog for Rockford Ledge Sink Fitting shows repair parts Numbers 13 through 22 which are readily replaced by the parts shown in my drawings; the parts of my invention being so machined as to readily fit into a cartridge which is repairable when repairs are required or the repair job is taken care of by employing a new cartridge containing the parts invented by myself. In this spedification, what is referred to as a conventional base with spout and removable seat is shown in the Gerber catalog as No. 140, Basin Cock Body; and forms no part of my invention.

In completing the brief summary of the invention, it should be apparent that an entirely new concept of a faucet as outlined above, has been made. There is disclosed herein a compact and easily removable cartridge of all parts invented by me. When included in a cartridge, the latter is lowered into the base casting and held in place by a hold-down sleeve which in turn is locked to the base casting by a nut, the faucet becoming operational without any further adjustment.

DETAILED DESCRIPTION

Figure 1:
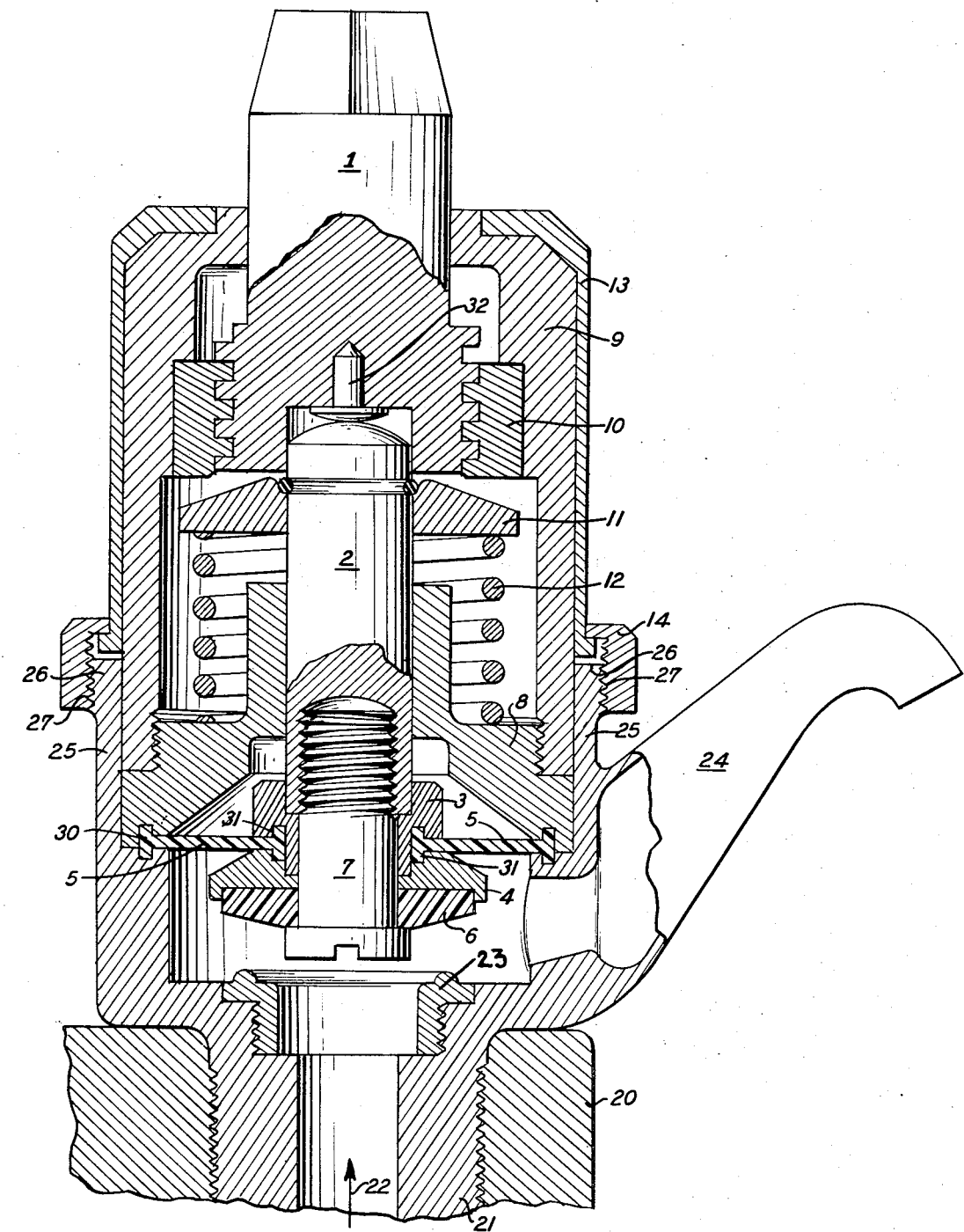

By reference to FIG 1, the faucet with its two portions is shown as mounted on a lavatory basin 20 in which the water supply pipe 21 is secured and by means of which water enters the faucet as indicated by the arrow 22, flowing past the removable valve seat 23 and thence to the spout 24. The conventional base with the spout 24 and the removable valve seat 23 includes side walls 25 extending to a point 26 where screw threads 27 are provided for later use. Now, all of this constitutes the lower valve seat portion and it is securely fastened to the basin. The incoming water on its way to and through spout 24 cannot flow through the upper portion of the faucet because it is effectively blocked by the diaphragm 5. The diaphragm seals off all water from contacting any portion of the valve operating mechanism, and by so doing it eliminates the use of stuffing boxes, packing glands, O-rings, etc., presently employed on other faucets on the market. To accomplish this there is provided a specially designed flexible diaphragm 5 having a formed collar at its inner and outer perimeters by means of which it is securely anchored in place in the regions 30 and 31. By keeping the valve operating parts lubricated and free of contact with water, should repairs be required, the parts are not difficult to remove since corrosion is not present.

Figure 3:
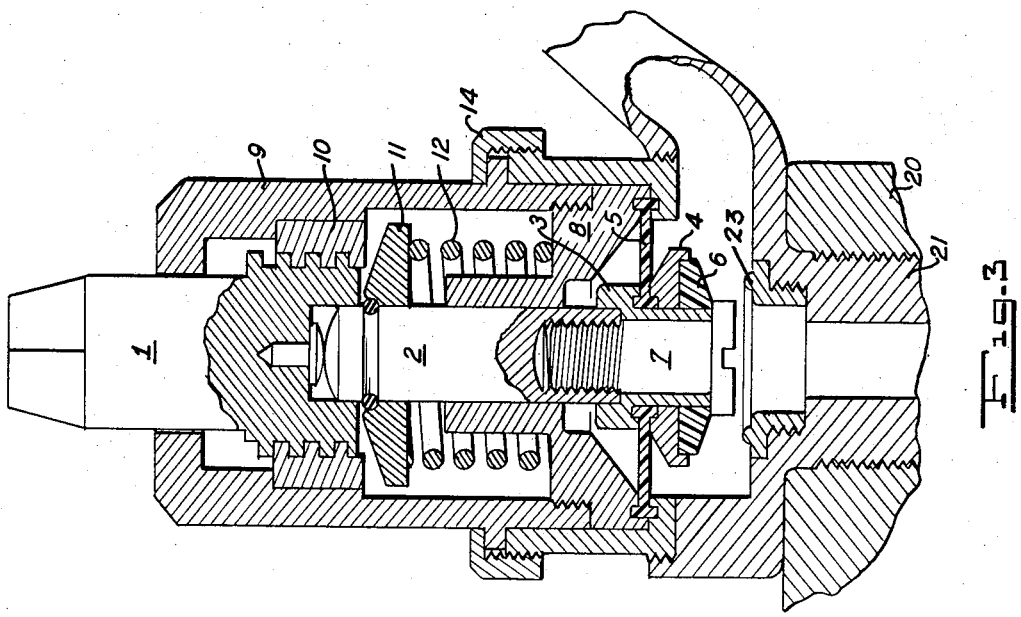
Figure 2:
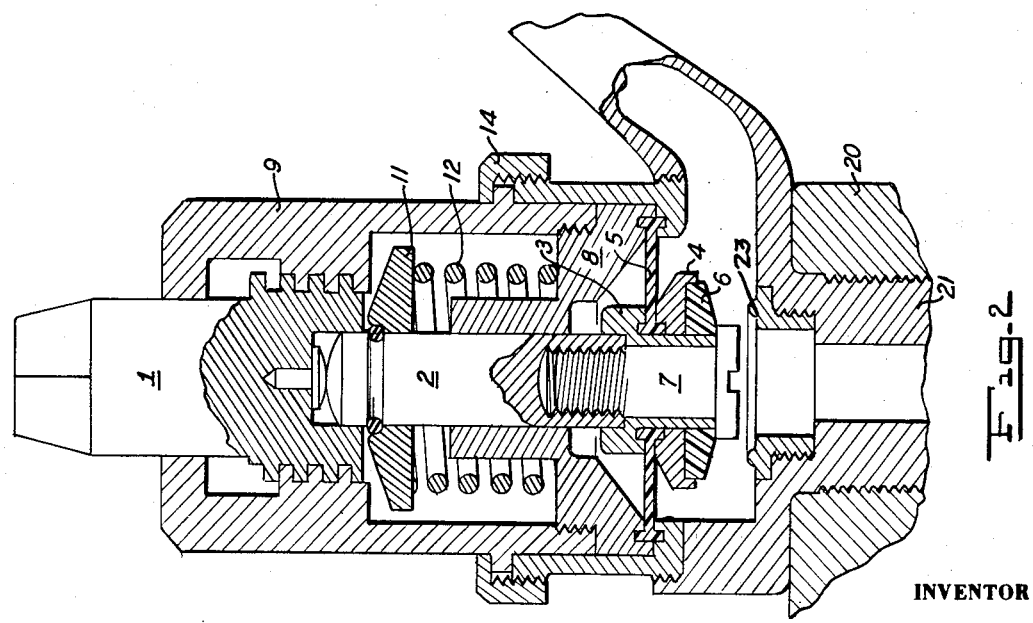

In FIG. 1, the operating spindle is 1; the valve stem is 2; the internal upper locking ring is 3; the internal lower locking ring is 4; said rings serving to hold the diaphragm 5 in place; the lower washer 6 is the conventional faucet washer; a machine screw 7 placed in the valve stem 2, when tightened, holds elements 3, 4, 5, and 6 together and in that order. The guide through which the valve stem 2 operates is 8; the bearing and sleeve for the operating spindle 1 is 9; the nut 10 matches the threads on the spindle 1; 11 is a collar on the upper end of the valve stem held in place with wire lock ring and pressure of spring 12; a hold-down sleeve is 13; a spring 12 is placed between the collar 11 and the guide 8; and 14 is a nut by means of which the two portions previously referred to are held together when the faucet is in operating position. A friction button 32 is provided between the spindle 1 and the valve stem 2, as shown:

Element 1 is the threaded operating spindle.
Element 2 is a valve stem.
Element 3 is an internal upper locking ring.
Element 4 is a lower internal locking ring.
Element 5 is a diaphragm.
Element 6 is the lower washer on the valve stem assembly.
Element 7 is a diaphragm screw (holds elements 3,4,5 and 6 together and in that order).
Element 8 is a guide through which valve stem 2 operates.
Element 9 is a bearing and threaded sleeve mated to the threaded operating spindle 1.
Element 11 is a collar on the upper end of the valve stem held in place with a wire lock ring and the pressure of spring 12.
Element 12 is a spring.
Element 14 is a nut by means of which elements 13 and 25 (FIG. 1) or element 9 (FIG. 1,2, and 3) and element 25 (FIG. 1) are held together.
Element 23 is a removable valve seat.
Element 20 is the lock nut with which Element 21 (representing the supply pipe and which is an integral part of No. 25, the base casting of faucet, (FIG. 1), is attached or fastened to the wash basin or sink. Thus, in FIGS. 1 and 2, there has been presented a compact and easily removable cartridge of all parts illustrated from 1 to 12. When this cartridge is lowered into the base casting, and finally held in place by the hold-down sleeve 13 which in turn is locked to the base casting by nut 14, the faucet becomes operational without any further adjustment.

A change has been made also in a portion of the internal locking ring 3 in that the lower end thereof has been extended so that it now goes all the way through elements 4, 5, and 6, thereby allowing a positively limited pressure on both the diaphragm and the lower washer 6.

I claim:

1. A valve assembly enclosed in a self-contained sectional cartridge on the lower end of which is affixed a specially designed flexible diaphragm which functions as a liquid block or seal entirely within the confines of said cartridge of which it is an integral part, said flexible diaphragm preventing liquid from coming into contact with any of the moving or wearing parts above the diaphragm, said diaphragm being made in the form of a washer and having formed collars both its inner and outer perimeters by which it is held in locked position at its outer perimeter in corresponding grooves in both the lower portion of the removable cartridge and the valve body base casting, said grooves conforming to the size and shape of the outer collar and encompassing said outer collar and being so designed as to limit pressure on the collar to prevent crushing or shearing, the lower portion of the removable cartridge having the corresponding groove therein further forming a valve stem guide, the upper portion of the removable cartridge is provided with an annular holding collar by which the valve assembly is held in place in the base casting with a union nut and containing the threaded operating spindle of the valve, the lower end of the spindle being drilled deep enough to receive a friction button against which the valve stem is continuously thrusted by a valve spring housed within the cartridge and which at the same time said operating spindle also serving as a guiding sleeve for the upper end of the valve stem.

2. A valve assembly as in claim 1 in which the flexible diaphragm is further anchored by the collar at the inner perimeter by corresponding grooves conforming to the size and shape of the inner collar, said corresponding grooves being formed in mating parts at the lower end of the valve stem, said mating parts acting to limit pressure applied to the inner collar to prevent shearing or crushing of the inner collar.

3. A valve assembly as in claim 1, in which the valve spring within the cartridge also functions as a pulsation and vibration damper on the valve by maintaining constant pressure on the valve stem against the operating spindle regardless of whether the valve is opened or closed.

4. A valve assembly as in claim 1 in which the removable cartridge is comprised of two sections and joined together near its lower end with a free running thread.

* * * * *